United States Patent [19]
Watanabe et al.

[11] Patent Number: 5,793,598
[45] Date of Patent: Aug. 11, 1998

[54] MAGNETICALLY LEVITATED VIBRATION DAMPING APPARATUS

[75] Inventors: Katsuhide Watanabe, Fujisawa; Yoichi Kanemitsu, Fukuoka; Takahide Haga, Kawasaki; Kenichi Yano, Chofu; Takayuki Mizuno, Chofu; Ryuta Katamura, Chofu, all of Japan

[73] Assignees: Ebara Corporation; Kajima Corporation, both of Tokyo, Japan

[21] Appl. No.: 695,850

[22] Filed: Aug. 9, 1996

[30] Foreign Application Priority Data

Aug. 11, 1995 [JP] Japan .................... 7-227078

[51] Int. Cl.$^6$ .................................. B66C 13/06
[52] U.S. Cl. ............................... 361/144; 361/146
[58] Field of Search .......................... 361/144, 146

[56] References Cited

U.S. PATENT DOCUMENTS 5,478,043  12/1995  Wakui ................ 248/550

FOREIGN PATENT DOCUMENTS 2-203040  8/1990  Japan .
2-266134  10/1990  Japan .
6-294445  10/1994  Japan .

OTHER PUBLICATIONS

Transactions of the Japan Society of Mechanical Engineers, Series C, vol. 61, No. 587, pp. 170–176, Jul. 1995, Weimin CUI et al., "Active Micro–Vibration Control System Using Both Air Springs and Magnetic Bearings".

*Primary Examiner*—Ronald W. Leja
*Attorney, Agent, or Firm*—Oblon, Spivak, McClelland, Maier & Neustadt, P.C.

[57] ABSTRACT

A magnetically levitated vibration damping apparatus includes a table having a flat board of a magnetic material, an electromagnetic actuator for applying magnetic attractive forces to the flat board to levitate the table, a displacement sensor for detecting relative displacement between the flat board and the electromagnetic actuator, an acceleration sensor for detecting absolute acceleration of the table, and a control system for controlling a current supplied to the electromagnetic actuator based on signals from the displacement sensor and the acceleration sensor according to a first control rule for controlling a gap between the flat board and the electromagnetic actuator based on the signal from the acceleration sensor and a second control rule for controlling vibrations of the table based on the signal from the acceleration sensor, the second control rule including stability control of relative displacement of the table.

16 Claims, 16 Drawing Sheets

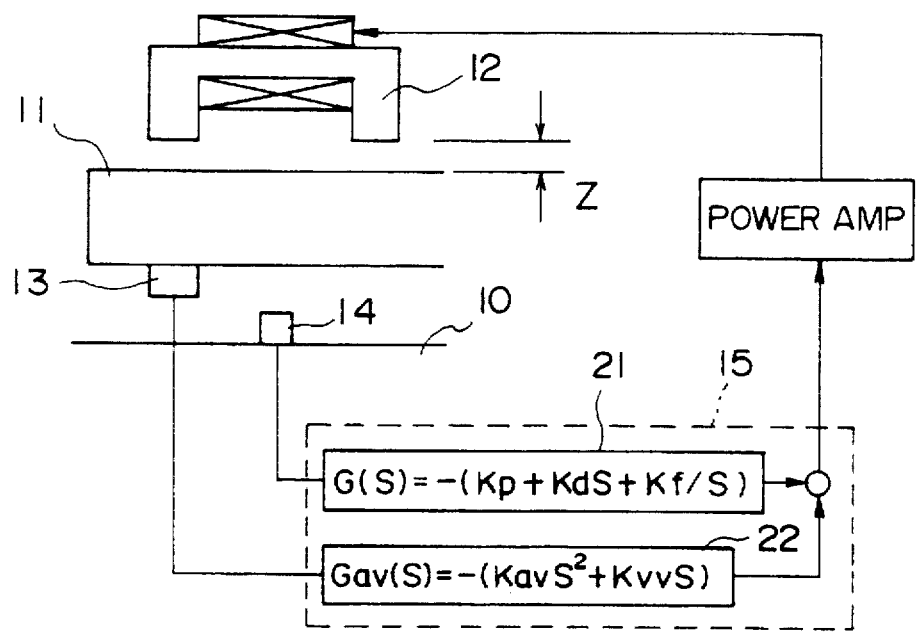
FIG. I PRIOR ART

MAGNETICALLY LEVITATED VIBRATION DAMPING APPARATUS

BACKGROUND OF THE INVENTION

1. Field of the Invention

The present invention relates to a magnetically levitated vibration damping apparatus, and more particularly to a magnetically levitated vibration damping apparatus for isolating a high-precision system such as a semiconductor fabrication apparatus, an electron microscope, or the like from vibrations of a floor on which the high-precision system is installed, so that the high-precision system will be free from yield and accuracy problems which would otherwise be imposed due to the vibrations of the floor.

2. Description of the Prior Art

High-precision systems such as a semiconductor fabrication apparatus, an electron microscope, or the like need to be isolated from vibrations of a floor on which they are installed because they will suffer yield and accuracy problems if they are not sufficiently isolated from the vibrations of the floor. It has been customary to dampen the vibrations of the floor with an air spring or a vibration-resistant rubber body which is positioned underneath the floor panel of a vibration attenuating base on which such a high-precision system is installed. Another type of vibration attenuating base which controls movement of a floor panel thereof has a hydraulic or pneumatic cylinder or an electromagnetic solenoid actuator for eliminating vibrations of the floor panel.

The vibration attenuating base which is vertically supported by the air spring or the vibration-resistant rubber body provides a vertical resonant system comprising a spring and a mass. The vibration attenuating base supported by the air spring or the vibration-resistant rubber body is capable of damping vibrations at frequencies higher than the resonant frequency of the vertical resonant system, but is totally ineffective to isolate vibrations at frequencies lower than the resonant frequency.

The vibration attenuating base has a frame which is installed in a building. The building has a horizontal natural frequency lower than a vertical natural frequency thereof, and transmits horizontal vibrations of the ground at all times. Therefore, the vibration attenuating base is particularly required to attenuate horizontal vibrations. The materials of the air spring and the vibration-resistant rubber body generally have a greater horizontal rigidity than a vertical rigidity thereof. The vibration attenuating base and the air spring or the vibration-resistant rubber body jointly provide a horizontal resonant system as well as the vertical resonant system. Because the natural frequency of the horizontal resonant system is equal to or higher than the natural frequency of the vertical resonant system, the vibration attenuating base is less effective to dampen horizontal vibrations than to dampen vertical vibrations. Therefore, the conventional vibration attenuating base fails to meet the requirement to attenuate horizontal vibrations.

There has been devised a magnetically levitated vibration damping apparatus as disclosed in Japanese laid-open patent publication No. 2-203040 and Japanese patent publication No. 4-74053, for example. The proposed magnetically levitated vibration damping apparatus has a table for supporting a system from which vibrations are to be isolated, and an electromagnetic actuator which supports the table out of contact therewith so that the table is levitated in the air magnetically. Consequently, vibrations from a floor on which the proposed magnetically levitated vibration damping apparatus is installed are not directly transmitted to the table. Magnetic attractive forces with which the table is supported in the air by the electromagnetic actuator and the table itself jointly make up a resonant system comprising a spring and a mass. The proposed magnetically levitated vibration damping apparatus also includes a controller which detects relative displacement between the table and the magnetic pole surface of the electromagnetic actuator and absolute acceleration of the table and controls a current supplied to the electromagnetic actuator under feedback control based on the detected relative displacement and absolute acceleration. Depending on the arrangement of the controller, a constant corresponding to the spring may vary, resulting in different vibration attenuation characteristics.

The inventors of the present application have reported one example of such a controller in "Study of a magnetically levitated vibration damping apparatus" (2nd report, the vibration attenuation characteristics of a three-dimensional vibration damping apparatus), written by Katsuhide Watanabe, Youichi Kanemitsu, Kenichi Yano, and Takayuki Mizuno, Machine Society, Collected lecture papers, No. 930–39, July 1993.

As shown in FIG. 1 of the accompanying drawings, the magnetically levitated vibration damping apparatus reported in the above document has an electromagnetic actuator 12 for magnetically levitating a table 11 to isolate vibrations which would otherwise be applied thereto. The electromagnetic actuator 12 comprises vertical and horizontal DC control electromagnets for generating vertical and horizontal magnetic attractive forces, and a displacement sensor 14 for detecting relative displacement between a floor 10 on which the magnetically levitated vibration damping apparatus is installed and the table 11. The table 11 has an acceleration sensor 13 for detecting vertical and horizontal absolute accelerations of the table 11.

The magnetically levitated vibration damping apparatus also has a control system 15 including vertical and horizontal control systems each comprising an analog controller. In operation, a vertical relative displacement between the floor 10 and the table 11 is detected by the displacement sensor 14, and fed back to control the DC control electromagnets to levitate the table 11 to a certain target position. The table 11 is horizontally held by a restoring force generated by the vertical DC control electromagnet. The vertical and horizontal absolute accelerations of the table are detected by the acceleration sensor 13, and fed back to control the DC control electromagnets to attenuate vibrations in the vertical and horizontal directions.

The vertical DC control electromagnet generates a magnetic attractive force Fa to vertically support the table 11 out of contact therewith, and also generates a restoring force Fr which serve to provide passive stable rigidity to hold the table 11 horizontally. The restoring force Fr is much smaller than the vertical magnetic attractive force Fa. Since the table 11 is stably held horizontally with the small passive rigidity, the table 11, once levitated, is isolated from horizontal vibrations applied from the floor 10.

The vertical DC control electromagnet is positioned above the table 11 for attracting and holding the table 11 under the vertical magnetic attractive force. If the relative displacement between the vertical DC control electromagnet and the table 11 is reduced, the table 11 is attracted toward the vertical DC control electromagnet. If the relative displacement between the vertical DC control electromagnet and the table 11 is increased, the table 11 is moved away from the vertical DC control electromagnet by gravity. Therefore, the vertical DC control electromagnet and the table 11 jointly constitute an unstable system.

In order to stabilize the unstable system, relative position feedback control is effected on the unstable system by a PID (proportional plus integral plus derivative) controller 21 of the control system 15. The vibration transmissibility G(S) of the unstable system which is stabilized, expressed by a transfer function, is given as follows:

$$G(S) = -(K_P + K_d S + K_I/S) \quad (1)$$

where $K_P$, $K_d$, $K_I$ are parameters.

With the above vibration transfer system, all the vibrations of the floor 10 are transmitted to the table 11 within a response frequency range of the relative displacement.

To improve the vibration transmissibility G(S), the control system 15 also has an acceleration and speed controller 22 for adding an absolute acceleration and speed feedback value $G_{av}(S)$, expressed below, to the vibration transmissibility G(S) in the relative position feedback system.

$$G_{av}(S) = -(K_{av} S^2 + K_{vv} S) \quad (2)$$

The transfer function of the displacement W(S) of the floor 10 and the displacement Z(S) of the table 11 is represented by the equation (3) given below, and hence the vibration transmissibility G(S) is improved by the acceleration $K_{av}$ and the speed $K_{vv}$.

$$\frac{Z(S)}{W(S)} = \frac{4K_{c2}K_{D3} + 4(K_{c2}K_P - K_{u2}) + 4\dfrac{K_{c2}K_I}{s}}{(m + 4K_{c2}K_{av})s^2 + 4(K_{cs}K_P + K_{cs}K_{vv})s + 4(K_{c2}K_P - K_{u2}) + 4\dfrac{K_{c2}K_I}{s}} \quad (3)$$

A sample of the conventional magnetically levitated vibration damping apparatus was manufactured and tested for evaluation on vibration attenuating characteristics of floor vibrations. FIGS. 2A, 2B and 3A, 3B show the vibration-resistant capabilities of the tested magnetically levitated vibration damping apparatus. Specifically, FIG. 2A shows the horizontal acceleration of the floor and FIG. 2B shows the horizontal acceleration of the table of the tested magnetically levitated vibration damping apparatus. FIG. 3A shows the vertical acceleration of the floor and FIG. 3B shows the vertical acceleration of the table of the tested magnetically levitated vibration damping apparatus. As shown in FIGS. 2A and 2B, the tested magnetically levitated vibration damping apparatus was able to dampen the horizontal floor vibrations to about ⅒. As shown in FIGS. 3A and 3B, the tested magnetically levitated vibration damping apparatus was able to dampen the vertical floor vibrations to about ½~⅓.

As described above, the conventional magnetically levitated vibration damping apparatus is sufficiently effective to attenuate the horizontal vibrations applied from the floor. However, even though the absolute acceleration and speed feedback value is added to the vibration transmissibility in the relative feedback system, the vertical floor vibrations are reduced to only about ½~⅓, which is not sufficient.

The PID controller 21 effects the relative position feedback control to keep a gap Z between the electromagnetic actuator 12 and the table 11 at a constant target value. The relative position control effected by the PID controller 21 includes an integral (I) control mode for reducing a steady error and a differential (D) control mode for stabilizing the table 11. The acceleration and speed controller 22 serves to feed back the absolute acceleration and speed of the table 11 in a direction across the gap Z to attenuate vibrations thereof. The differential (D) control mode for stabilizing the table 11 is related to the control process carried out by the acceleration and speed controller 22 because the differential (D) control mode is similar to the single and double differentiation by the acceleration and speed controller 22 of the displacement of the table 11 across the gap Z for attenuating vibrations of the table 11. Therefore, if optimum parameters are selected for the differential (D) control mode for stabilizing the table 11, then the vibrations of the table 11 will not be sufficiently attenuated in the control process carried out by the acceleration and speed controller 22. Conversely, if optimum parameters are selected for the control process carried out by the acceleration and speed controller 22, then the table 11 will not be sufficiently stabilized in the differential (D) control mode. Even after the parameters are repeatedly selected, the vertical stability of the table 11 and the attenuation of the vibrations thereof are not sufficiently achieved.

SUMMARY OF THE INVENTION

It is therefore an object of the present invention to provide a magnetically levitated vibration damping apparatus which is capable of sufficiently attenuating vibrations vertically as well as horizontally.

According to the present invention, there is provided a magnetically levitated vibration damping apparatus comprising: a table for supporting a system to be isolated from vibrations of a floor, the table having a flat board of a magnetic material; an electromagnetic actuator for applying magnetic attractive forces to the flat board to levitate the table; a displacement sensor for detecting relative displacement between the flat board and the electromagnetic actuator; an acceleration sensor for detecting absolute acceleration of the table; and a control system for controlling a current supplied to the electromagnetic actuator based on signals from the displacement sensor and the acceleration sensor according to a first control rule for controlling a gap between the flat board and the electromagnetic actuator surface based on the signal from the displacement sensor and a second control rule for controlling vibrations of the table based on the signal from the acceleration sensor, the second control rule including stability control of relative displacement of the table of the first control rule.

The first control rule may comprise a PI control rule, and the second control rule may comprise an H∞ control rule.

The control system may comprise means for controlling the current supplied to the electromagnetic actuator under a combination of H∞ control and PI control.

The magnetically levitated vibration damping apparatus may further comprise an air spring actuator for supporting the table.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 1 is a diagram showing the concept of a conventional magnetically levitated vibration damping apparatus;

DETAILED DESCRIPTION OF THE PREFERRED EMBODIMENTS

Figure 2A:
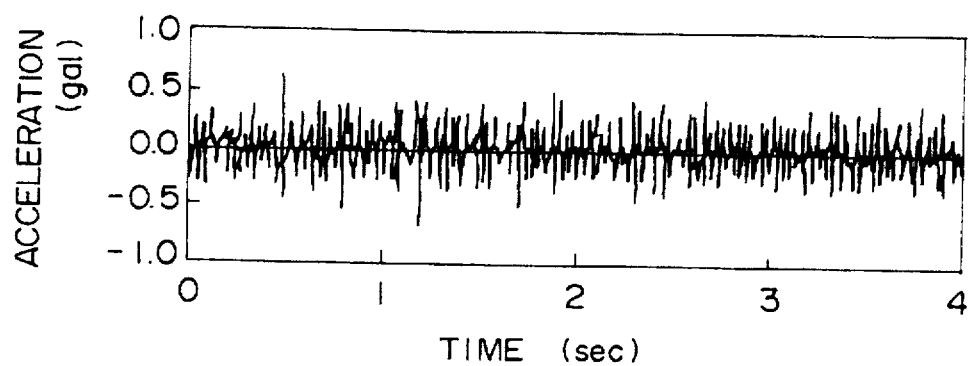
FIG. 2A is a diagram showing the horizontal acceleration of a floor with respect to the conventional magnetically levitated vibration damping apparatus which was tested.
Figure 2B:
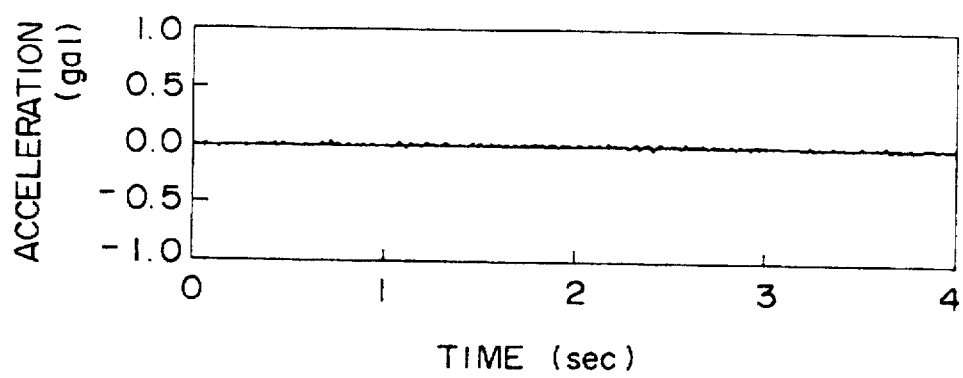
FIG. 2B is a diagram showing the horizontal acceleration of the table of the tested magnetically levitated vibration damping apparatus.
Figure 3A:
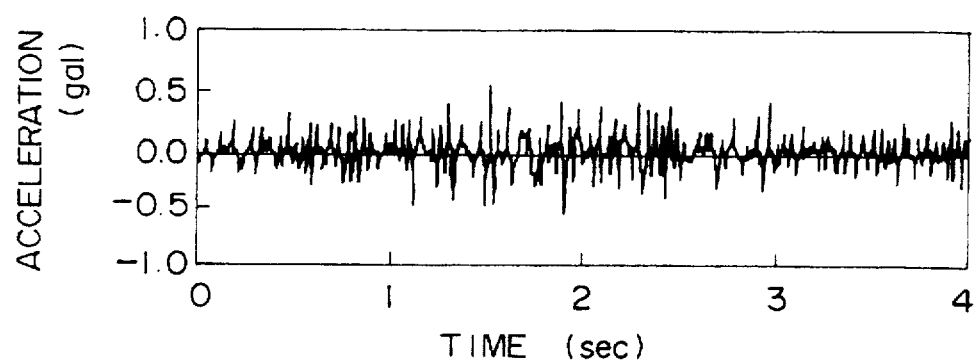
FIG. 3A is a diagram showing the vertical acceleration of the floor with respect to the conventional magnetically levitated vibration damping apparatus which was tested.
Figure 3B:
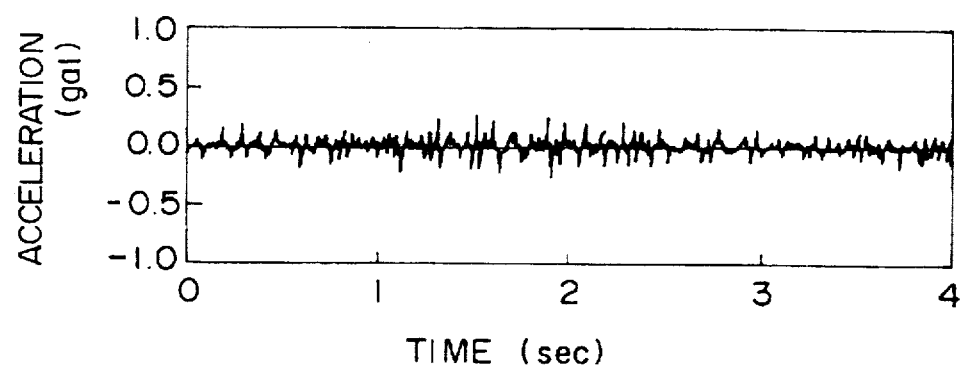
FIG. 3B is a diagram showing the vertical acceleration of the table of the tested magnetically levitated vibration damping apparatus.

Like or corresponding parts are denoted by like or corresponding reference numerals.

Figure 4:
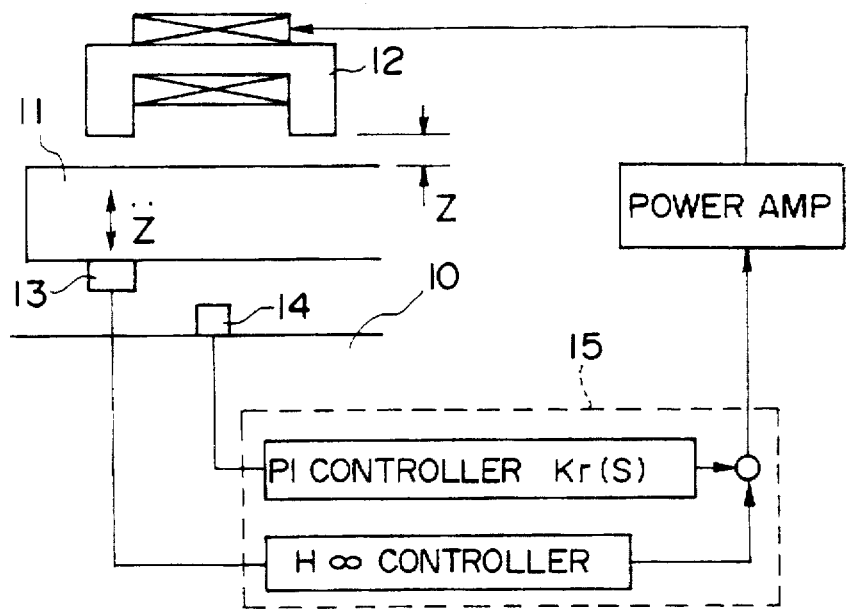
FIG. 4 is a diagram showing the concept of a magnetically levitated vibration damping apparatus according to the present invention.

FIG. 4 schematically shows the concept of a magnetically levitated vibration damping apparatus according to the present invention.

As shown in FIG. 4, the magnetically levitated vibration damping apparatus according to the present invention is installed on a floor 10, and has a table 11 for supporting a system from which vibrations are to be isolated, an electromagnetic actuator 12 for magnetically levitating the table 11 out of contact therewith to isolate vibrations which would otherwise be applied thereto from a floor 10, an acceleration sensor 13 mounted on the table 11 for detecting vertical and horizontal absolute accelerations of the table 11, a displacement sensor 14 mounted on the floor 10 for detecting relative displacement between the floor 10 and the table 11, and a control system 15 having a PI controller for controlling a gap (relative displacement) Z between the electromagnetic actuator 12 and the table 11 and an H∞ controller for controlling vibrations of the table 11. The H∞ controller controls vibrations of the table 11 in a manner to contain stability control of the table 11. This is effective to unify the derivative control and solve the conventional problem that two control rules are correlated. Parameters in proportional, integral, and derivative systems of the magnetically levitated vibration damping apparatus can be established independently of each other.

The magnetically levitated vibration damping apparatus according to the present invention is thus capable of sufficiently eliminating vibrations of the table in the vertical direction while stabilizing the table.

Magnetically levitated vibration damping apparatus according to specific embodiments of the present invention will be described below.

Figure 5:
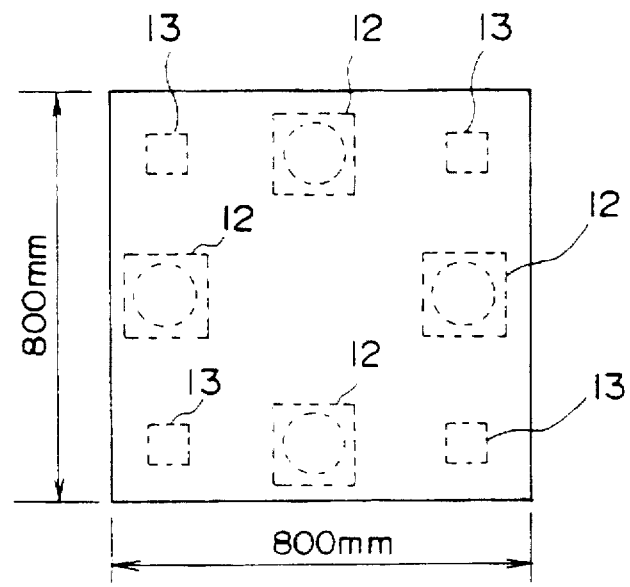
FIG. 5 is a plan view of a magnetically levitated vibration damping apparatus according to a first embodiment of the present invention.
Figure 6:
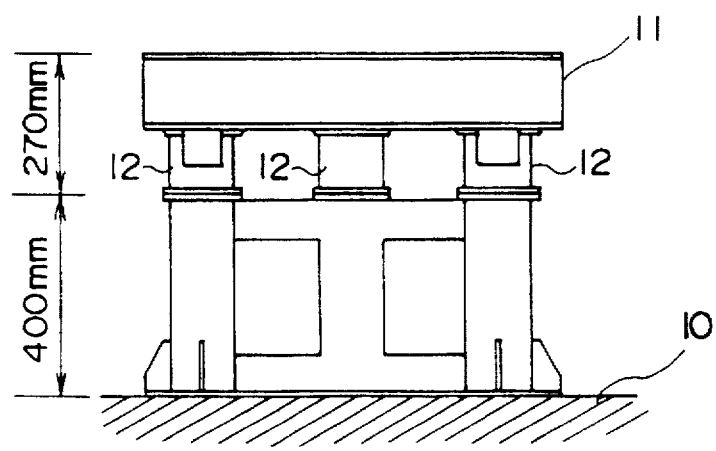
FIG. 6 is a front elevational view of the magnetically levitated vibration damping apparatus shown in FIG. 5.

As shown in FIGS. 5 and 6, a magnetically levitated vibration damping apparatus according to a first embodiment of the present invention basically comprises a flat table 11 for supporting a system from which vibrations are to be isolated, the table having a flat board of a magnetic material, four electromagnetic actuators 12 for magnetically levitating the table 11 by attracting the flat board out of contact therewith, and a controller (described below) for controlling the electromagnetic actuators 12. Acceleration sensors 13 for detecting vibrations of the table 11 are mounted on the table 11. The electromagnetic actuators 12 are associated with respective displacement sensors for detecting relative displacements between the table 11 and the floor 10. The electromagnets of the electromagnetic actuators 12 include vertical and horizontal DC control electromagnets for generating vertical and horizontal magnetic attractive forces for magnetically levitating the table 11 and eliminating unwanted vibrations from the table 11. The vertical DC control electromagnets, which are four in number, are capable of bearing objects having considerable weights.

Figure 7:
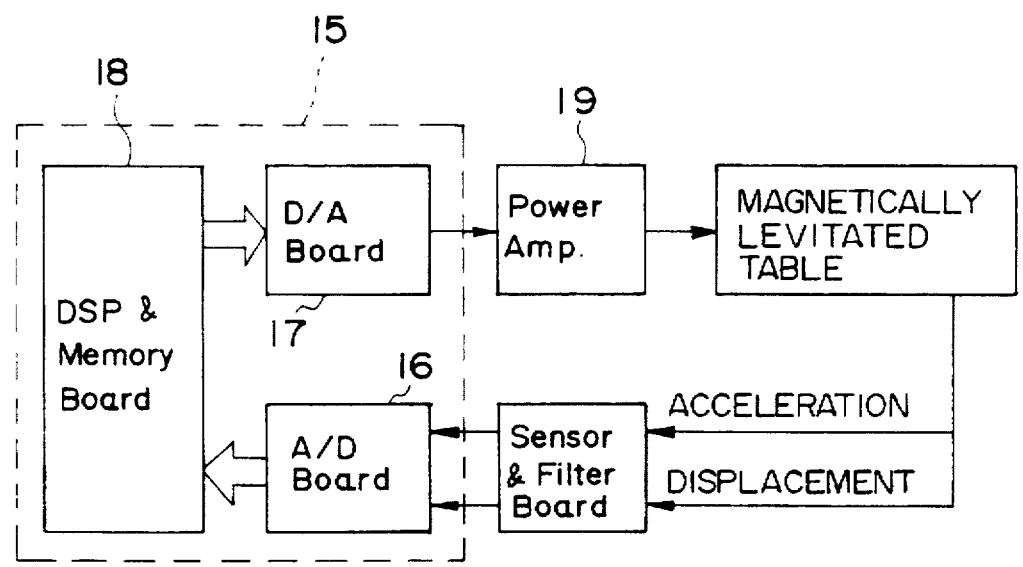
FIG. 7 is a block diagram of a feedback system of the magnetically levitated vibration damping apparatus shown in FIGS. 5 and 6.

FIG. 7 shows a control system of the magnetically levitated vibration damping apparatus shown in FIGS. 5 and 6. As shown in FIG. 7, the control system includes a digital controller 15 having a digital signal processor (DSP) 18, an A/D converter 16, and a D/A converter 17. Relative displacement signals from the displacement sensors and absolute acceleration signals from the acceleration sensors 13 are transmitted through the A/D converter 16 to the DSP 18. The DSP 18 processes the supplied signals, and produces and outputs digital signals through the D/A converter 17 and a power amplifier 19 to electromagnets of the electromagnetic actuators 12 for thereby magnetically levitating the table 11 and eliminating unwanted vibrations from the table 11.

Figure 8:
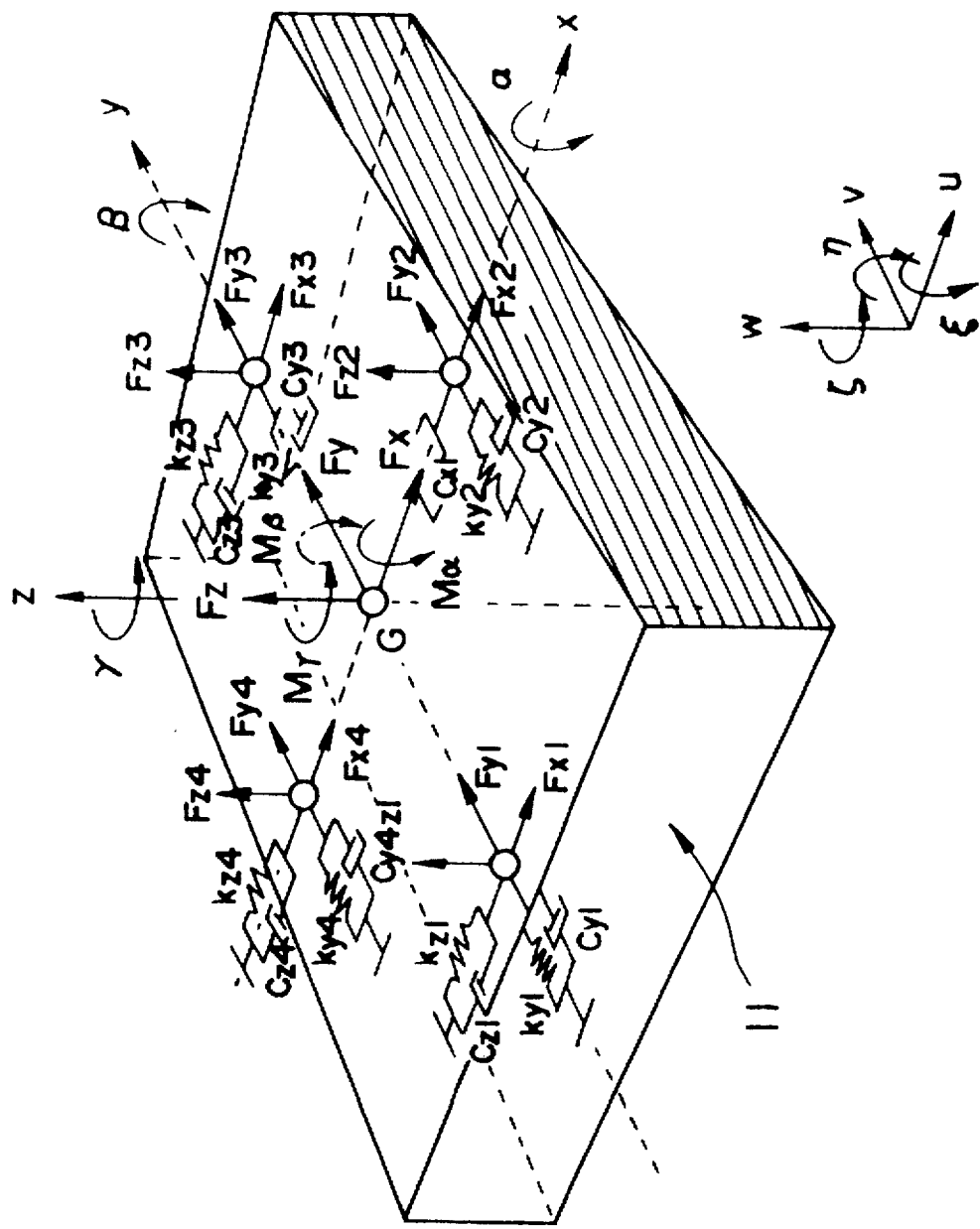
FIG. 8 is a perspective view showing a model of the magnetically levitated vibration damping apparatus shown in FIGS. 5 and 6.

FIG. 8 illustrates a model of the magnetically levitated vibration damping apparatus shown in FIGS. 5 and 6. In FIG. 8, the table 11 is held in equilibrium by the four electromagnetic actuators 12. The magnetic attractive forces are generated by the electromagnets in the directions of the coordinate axes shown in FIG. 8, and act on points which lie in an x-y plane, i.e., a horizontal plane which contains the center of gravity of the table 1. Various symbols used in FIG. 8 are defined as follows:

G: center of gravity;

$F_{xi}$, $F_{yi}$, $F_{zi}$ (i=1~4): control forces of the electromagnetic actuators;

Mα, Mβ, Mγ: control force moments;

$K_{xi}$, $K_{yi}$ (i=1~4): spring constants due to magnetic restoring forces generated in the horizontal direction by the vertical control electromagnets;

$C_{xi}$, $C_{yi}$ (i=1~4): damping coefficients due to magnetic restoring forces generated in the horizontal direction by the vertical control electromagnets;

x, y, z: displacements of the table;

α, β, γ: angular displacements of the table;

u, v, w: displacements of the floor; and

ε, η, ξ: angular displacements of the floor.

The model shown in FIG. 8 is assumed to be the case of the perfectly uncoupled support of an ideal rigid body, allows the control system to be designed independently with respect to each degree of freedom. Therefore, the model satisfies the following conditions:

(1) The coordinate axes coincide with the inertial main axes of the magnetically levitated vibration damping apparatus, dispensing with an inertia coupled term.

(2) The elastic center and elastic main axes due to the magnetic restoring forces generated in the horizontal direction by the four vertical control electromagnets coincide with the center of gravity and the inertial main axes of the magnetically levitated vibration damping apparatus.

The magnetically levitated vibration damping apparatus has the following equation of motion:

$$M\ddot{X}+C\dot{X}+KX=F \quad (4)$$

where $X=[xyz\alpha\beta\gamma]^T$
$M=\text{diag}[mmmI_\alpha I_\beta I_\gamma]$
$C=\text{diag}[C_x C_y 000 C_{6s}]$
$K=\text{diag}[K_x K_y 000 K_\gamma]$
$F=[F_x F_y F_z M_\alpha M_\beta M_\gamma]^T$ where m is the mass, $I_\alpha$, $I_\beta$, $I_\gamma$ are the inertial moments around the respective axes, $K_x$, $K_y$, $K_\gamma$ are the spring constants due to magnetic restoring forces generated in the horizontal direction by the vertical control electromagnets, and $C_x$, $C_y$, $C_\gamma$ are the damping coefficients due to magnetic restoring forces generated in the horizontal direction by the vertical control electromagnets.

A control force vector F, when linearized in the vicinity of the state of balance or equilibrium, is expressed as follows:

$$F=K_u(X-X_o)+K_c I_c \quad (5)$$

where $X_o=[uvw\xi\eta\zeta]^T$
$I_c=[i_x i_y i_z i_\alpha i_\beta i_\gamma]^T$
$K_u=\text{diag}[K_{ux} K_{uy} K_{uz} K_{u\alpha} K_{u\beta} K_{u\gamma}]$
$K_c=\text{diag}[K_{cx} K_{cy} K_{cz} K_{c\alpha} K_{c\beta} K_{c\gamma}]$ where I is the control currents, and $K_u$, $K_c$ are constants by which to multiply the displacement and the currents, respectively.

The control system for the model is designed on the assumption that it has six independent degrees of freedom. The control system for vertically controlling the table to levitate the table stably and attenuate vibrations simultaneously will be described below. The vertical control system has one degree of freedom for translational motion and two degrees of freedom for rotational motion. The vertical control system is designed independently for the three degrees of freedom by applying the robust H∞ (infinity) control theory. Actually, the signals (representative of the relative displacements and the absolute accelerations) detected by the sensors and the control currents supplied to the electromagnets are converted in coordinates by the controller for making it possible to control the table for each of the degrees of freedom. The designing of the control system with one degree of freedom for translational motion will be described below.

An object to be controlled with one degree of freedom for translational motion, expressed in a state space, is represented by:

$$\dot{X}_p=A_p X_p+B_p i_p \quad (6)$$

$$y=C_p X_p+D_p i_p \quad (7)$$

where $X_p=[z\dot{z}]$ $$A_p=\begin{bmatrix} 0 & 1 \\ \frac{K_w}{m} & 0 \end{bmatrix} \quad B_p=\begin{bmatrix} 0 \\ \frac{K_\alpha}{m} \end{bmatrix}$$

$$C_p=\begin{bmatrix} \frac{K_w}{m} & 0 \end{bmatrix} \quad D_p=\begin{bmatrix} \frac{K_\alpha}{m} \end{bmatrix}$$

where z is the absolute displacement in the vertical direction. The magnetic attractive forces in the vertical direction suffer a phase delay due to an eddy current produced because the table is made of a solid material. Such a phase delay Ka(S) is expressed by the following state equations (8) and (9):

$$\dot{x}_f=A_f x_f+B_f i_z \quad (8)$$

$$i_p=C_f x_f \quad (9)$$

where $A_f$, $B_f$, $C_f$ are constants when approximated with a delay of first order.

The controller to be designed needs to meet the requirements for levitation control and vibration elimination control simultaneously. Therefore, it is necessary to feed back both the relative displacement between the table and the floor and the absolute acceleration of the table. For this reason, a generalized plant which is produced includes a relative displacement feedback system. The relative displacement feedback system has a PI (proportional plus integral) controller Kr(S) required to levitate and position the table in the center of the gap between the table and the electromagnets. The PI controller $K_r(S)$ is expressed by the following equations (10), (11), and a control input u is expressed by the following equation (12):

$$\dot{x}_r=A_r x_r+B_r y_r \quad (10)$$

$$u_r=C_r x_r+D_r y_r \quad (11)$$

$$u=i_z+u_r \quad (12)$$

Figure 9:
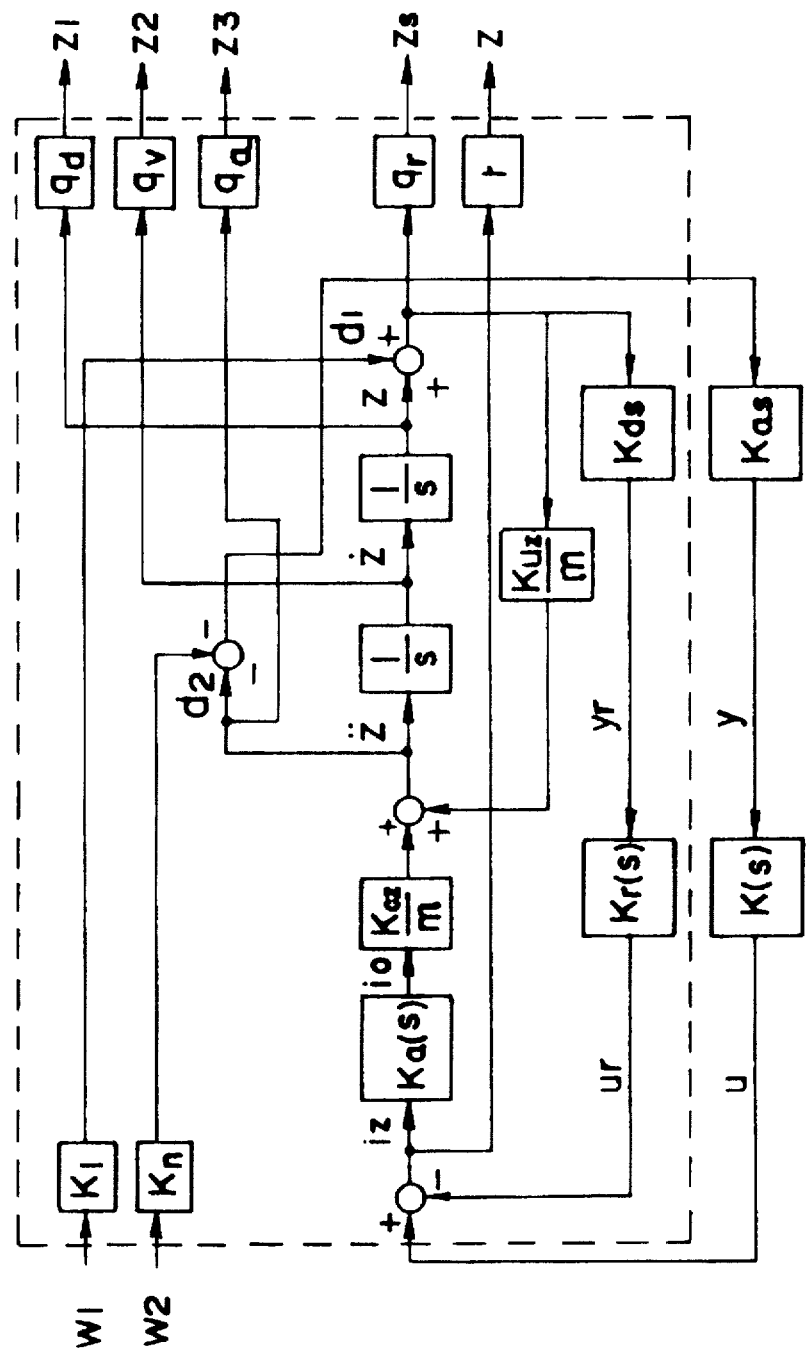
FIG. 9 is a block diagram of a generalized plant of a controller of the magnetically levitated vibration damping apparatus shown in FIGS. 5 and 6.

FIG. 9 shows the generalized plant of the controller. Disturbances applied to the generalized plant are floor vibration $w_1$ and acceleration sensor noise $w_2$. Actually, values $d_1$, $d_2$, given below, produced by multiplying the disturbances $w_1$, $w_2$ by respective weighting coefficients $K_f$, $K_n$ are applied to the generalized plant.

$$d_1 = K_f w_1 \tag{13}$$

$$d_2 = K_n w_2$$

Control quantities are selected to be absolute quantities (displacement, speed, acceleration) and relative displacements of the table. The control input (control currents) is also evaluated as it is to be reduced to an approximate level. These quantities are represented as follows:

$$z = \begin{bmatrix} z_1 \\ z_2 \\ z_3 \\ z_4 \\ z_5 \end{bmatrix} = \begin{bmatrix} q_d z \\ q_v \dot{z} \\ q_a \ddot{z} \\ r_i z \\ q_r(z+d_l) \end{bmatrix} \tag{14}$$

Weighting coefficients for the control quantities and the control input are given as scalar quantities. Since all absolute quantities (displacement, speed, acceleration) are evaluated, the control quantities and the control input are weighted in the same manner as when they are frequency-weighted, resulting in a lower dimension for the controller. An output y is given as an absolute acceleration detected by the acceleration sensors, and expressed as follows:

$$y = K_{as}(\ddot{z}+d_2) \tag{15}$$

where $K_{as}$ is the gain of the acceleration sensors, and $K_{ds}$ is the gain of the displacement sensors. From the foregoing, it is possible to derive the generalized plant shown in FIG. 8. Therefore, the state space model of the generalized plant is defined as the following equations (16), (17), (18):

$$\dot{x} = Ax + B_1 w + B_2 u \tag{16}$$

$$z = C_1 x + D_{11} w + D_{12} u \tag{17}$$

$$y = C_2 x + D_{21} w + D_{22} u \tag{18}$$

where $$x = [x_p, x_f, x_r]^T \quad w = [w_1, w_2]^T$$

$$A = \begin{bmatrix} A_p & B_p C_f & 0 \\ B_f D_r K_{ds} F_p & A_f & -B_f C_r \\ B_r K_{ds} F_p & 0 & A_r \end{bmatrix}$$

$$B_1 = \begin{bmatrix} A_p H_p K_f & 0 \\ B_f D_r K_{ds} K_f & 0 \\ B_r K_{ds} K_f & 0 \end{bmatrix} \quad B_2 = \begin{bmatrix} 0 \\ B_f \\ 0 \end{bmatrix}$$

$$C_1 = \begin{bmatrix} q_d F_p & 0 & 0 \\ q_v E_p & 0 & 0 \\ q_a E_p A_p & q_a E_p B_p C_f & 0 \\ -r D_r K_{ds} F_p & 0 & -r C_r \\ q_r F_p & 0 & 0 \end{bmatrix}$$

$$C_2 = [K_{as} E_p A_p \quad K_{as} E_p B_p C_f \quad 0]$$

-continued $$D_{11} = \begin{bmatrix} 0 & 0 \\ 0 & 0 \\ q_a E_p A_p H_p K_f & 0 \\ -r D_r K_{ds} K_f & 0 \\ q_r K_f & 0 \end{bmatrix} \quad D_{12} = \begin{bmatrix} 0 \\ 0 \\ 0 \\ r \\ 0 \end{bmatrix}$$

$$D_{21} = [K_{as} E_p A_p H_p K_f \quad 0] \quad D_{22} = [0]$$

$$H_p = \begin{bmatrix} 1 \\ 0 \end{bmatrix} \quad F_p = [1 \quad 0] \, E_p = [0 \quad 1]$$

An H∞ controller is designed with respect to an expanded system including the PI controller for feeding back the relative displacements produced above. From the state space model of the generalized plant, a transfer function is expressed according to the following equation (19):

$$\begin{bmatrix} z \\ y \end{bmatrix} = G(s) \begin{bmatrix} w \\ u \end{bmatrix} = \begin{bmatrix} G_{11}(s) & G_{12}(s) \\ G_{21}(s) & G_{22}(s) \end{bmatrix} \begin{bmatrix} w \\ u \end{bmatrix} \tag{19}$$

where $$G_{11}(s) = C_1(sI-A)^{-1}B_1 + D_{11} \tag{20}$$

$$G_{12}(s) = C_1(sI-A)^{-1}B_2 + D_{12} \tag{21}$$

$$G_{21}(s) = C_2(sI-A)^{-1}B_1 + D_{21} \tag{22}$$

$$G_{22}(s) = C_2(sI-A)^{-1}B_2 \tag{23}$$

If a control rule for the expanded system is defined as:

$$u = K(s)y$$

and a feedback control system is constructed with such a control rule, then the transfer function of a closed loop from w to z is given by the following equation (24):

$$\phi = G_{11} + G_{12} K(I - G_{22} K)^{-1} G_{21} \tag{24}$$

The controller K(s) for internally stabilizing G(s) and satisfying the inequality (25) given below is determined:

$$\|\phi\|_\infty < \gamma \tag{25}$$

In order to both stabilize the magnetically levitated system and obtain good vibration eliminating performance at the same time in determining the controller, each of the weighting coefficients and γ are selected to minimize the sensitivity from the disturbance $d_1$ to the absolute displacement z at low frequencies, and repeated calculations are carried out.

Figure 10:
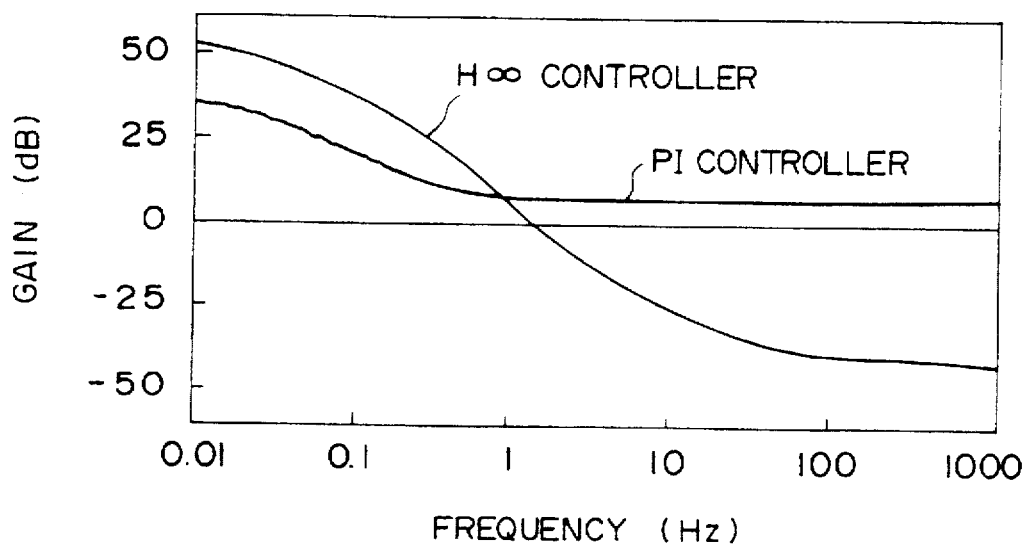
FIG. 10 is a diagram showing the frequency characteristics of an H∞ controller and a PI controller of the magnetically levitated vibration damping apparatus shown in FIGS. 5 and 6.

FIG. 10 shows the frequency characteristics of the H∞ controller and the PI controller, which have been designed by way of example, of the magnetically levitated vibration damping apparatus shown in FIGS. 5 and 6.

Figure 11:
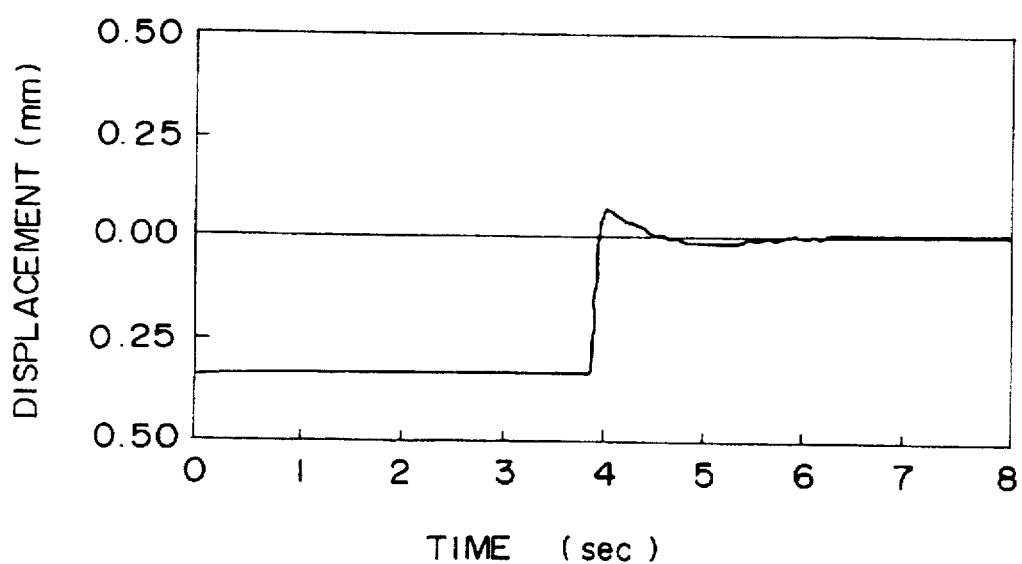
FIG. 11 is a diagram showing the step response of the H∞ controller and the PI controller of the magnetically levitated vibration damping apparatus shown in FIGS. 5 and 6.
Figure 12:
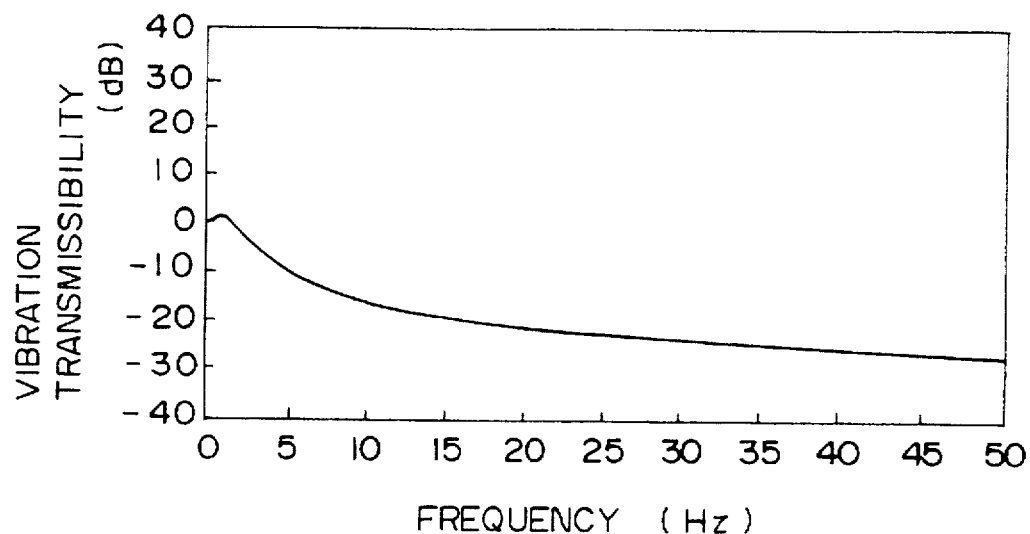
FIG. 12 is a diagram showing the vibration transmissibility of the H∞ controller and the PI controller of the magnetically levitated vibration damping apparatus shown in FIGS. 5 and 6.

FIG. 11 shows the step response of the H∞ controller and the PI controller, and FIG. 12 shows the sensitivity, i.e., the vibration transmissibility of the H∞ controller and the PI controller from the disturbance $d_1$ to the absolute displacement z.

It can be seen from FIGS. 10 and 11 that the H∞ controller and the PI controller can provide a good vibration transmissibility while stably levitating the table. Controllers with two degrees of freedom for rotational motion is similarly designed.

Figure 13:
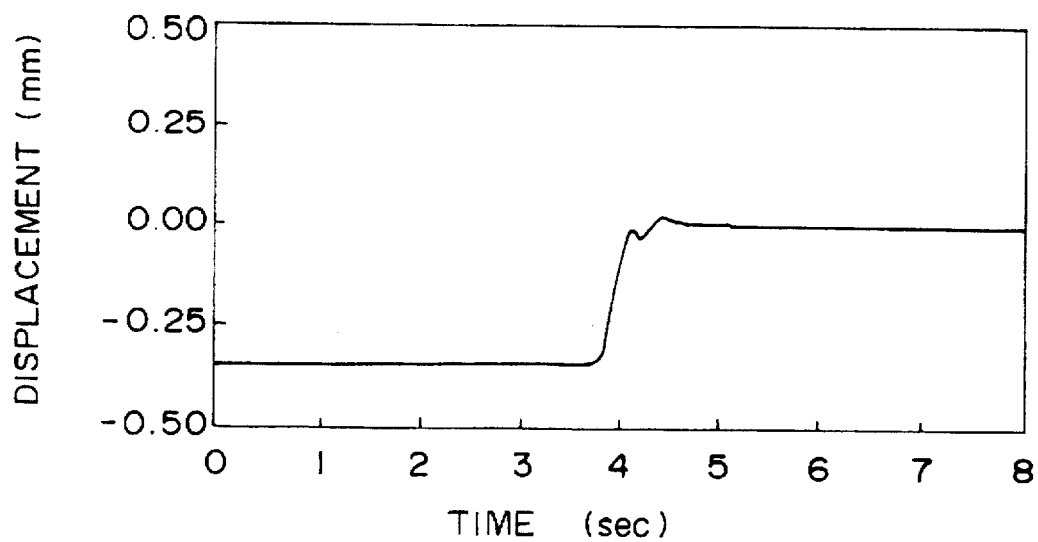
FIG. 13 is a diagram showing the response characteristics of a table, when magnetically levitated, of the magnetically levitated vibration damping apparatus shown in FIGS. 5 and 6.
Figure 14:
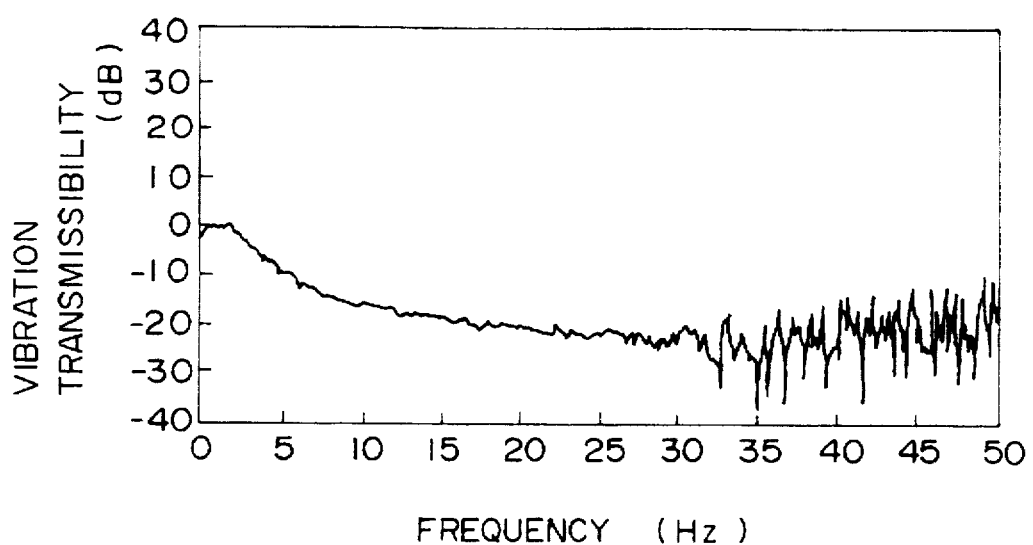
FIG. 14 is a diagram showing the vibration transmissibility of the acceleration of a floor and the table of the magnetically levitated vibration damping apparatus shown in FIGS. 5 and 6.
Figure 15A:
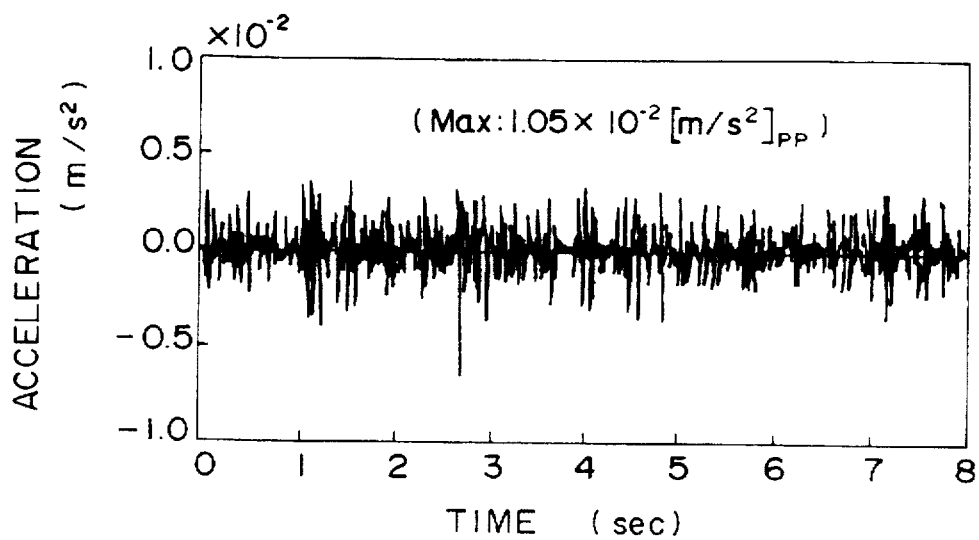
FIG. 15A is a diagram showing the vibration (acceleration) of the floor of the magnetically levitated vibration damping apparatus shown in FIGS. 5 and 6.
Figure 15B:
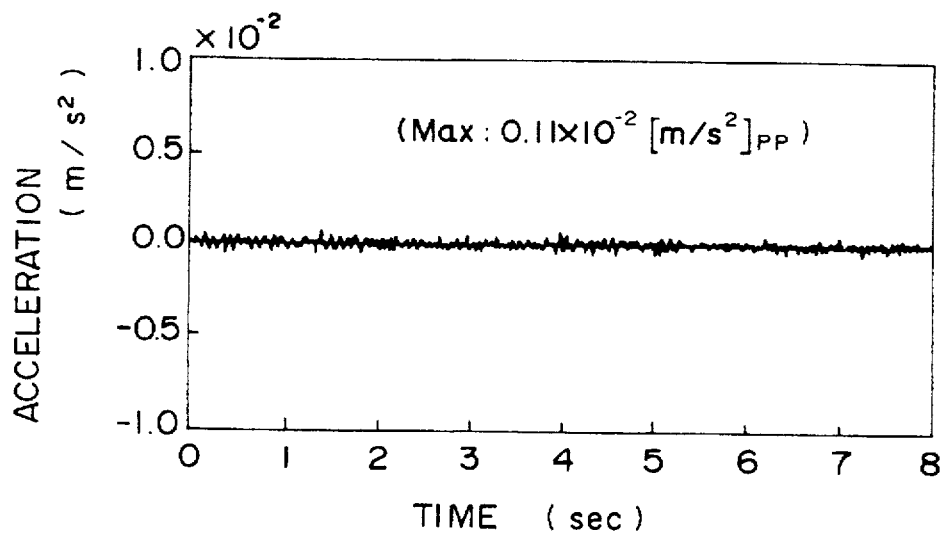
FIG. 15B is a diagram showing the vibration (acceleration) of the table of the magnetically levitated vibration damping apparatus shown in FIGS. 5 and 6.
Figure 16:
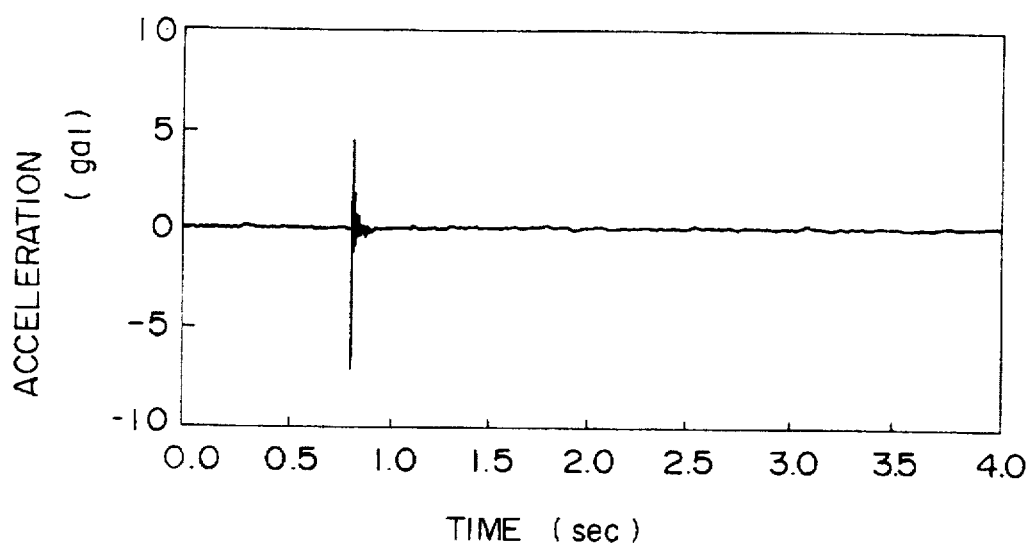
FIG. 16 is a diagram showing the shock characteristics of the table of the magnetically levitated vibration damping apparatus shown in FIGS. 5 and 6 when a disturbance was applied directly to the table.

The designed controller with three degrees of freedom was implemented as a digital controller and tested for evaluation. The controller with three degrees of freedom comprised an H∞ controller and a PI controller, and had two input terminals and one output terminal. FIG. 13 shows the response characteristics of the table at the time which was magnetically levitated. FIG. 14 shows the vibration transmissibility of the acceleration of the floor and the table at the time when the table was in equilibrium. FIGS. 15A and 15B show the vibration (acceleration) of the floor and the table as it varied with time. From the results shown in FIGS. 13, 14, 15A, and 15B, it can be understood that substantially the same performance as simulated was achieved for levitating the table stably and at the same time reducing vibrations from the floor to about ⅒. FIG. 16 illustrates the shock characteristics of the table when a disturbance was applied directly to the table. A study of FIG. 16 indicates that the acceleration of the table was instantaneously converged.

In the first embodiment, the electromagnetic actuators are employed to magnetically levitate the table out of contact therewith. However, an air spring actuator may be used in combination with the electromagnetic actuators for magnetically levitating the table as described below.

Figure 17:
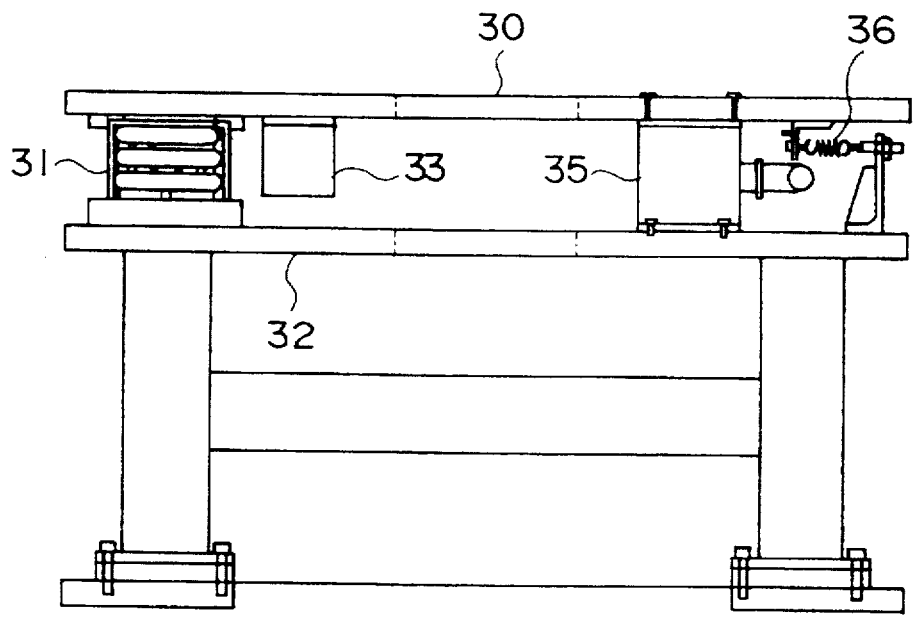
FIG. 17 is a front elevational view of a magnetically levitated vibration damping apparatus according to a second embodiment of the present invention.
Figure 18:
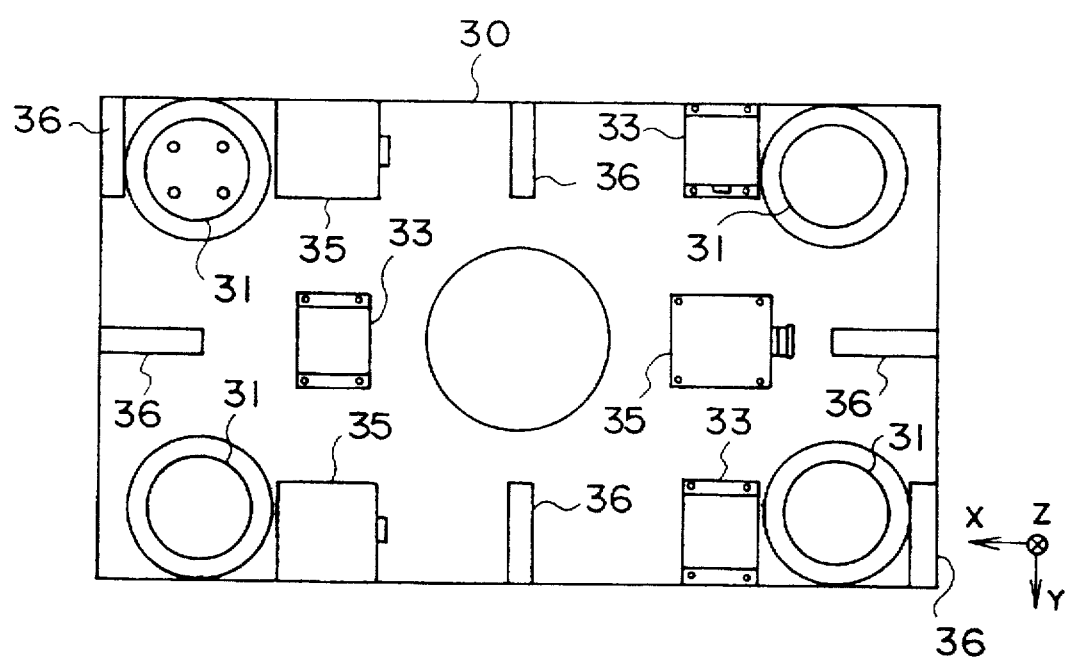
FIG. 18 is a plan view of the magnetically levitated vibration damping apparatus shown in FIG. 17.

FIGS. 17 and 18 shows a magnetically levitated vibration damping apparatus according to a second embodiment of the present invention. As shown in FIGS. 17 and 18, the magnetically levitated vibration damping apparatus has a table 30 for supporting a high-precision system such as a semiconductor fabrication apparatus, an electron microscope, or the like, which should be isolated from vibrations. The table 30 is vertically supported by air springs 31 positioned at its respective four corners. The air springs 30 have lower ends fixed to a common base 32 which is fixedly mounted on a floor. Acceleration sensors 33 for detecting accelerations in X, Y, and Z directions are mounted on the table 30.

The air springs 31 are controlled by an air pressure controller 42 (see FIG. 19) for vertically positioning the table 30 based on signals from displacement sensors 38 (see FIG. 19) to bear most of the weight of the table 30 and the high-precision system supported on the table 30. The displacement sensors are combined with respective electromagnetic actuators 35 disposed between the table 30 and the common base 32. The displacement sensors detect the gap between the common base 32 and the table 30 for thereby detecting relative displacements of the table 30. Vibrations detected by the acceleration sensors 33 are fed back to control currents supplied to the electromagnetic actuators 35 for thereby controlling magnetic attractive forces applied from the electromagnetic actuators 35 to the table 30 for horizontally and vertically attenuating vibrations of the table 30.

In the second embodiment, six coil springs 36 for positioning the table 30 in the horizontal direction are positioned in the X, Y, and θ directions. The coil springs 36 thus placed in the X, Y, and θ directions produce springs forces effective to balance the table 30 in the center of the gap between the table 30 and the horizontal electromagnetic actuators 35.

Figure 19:
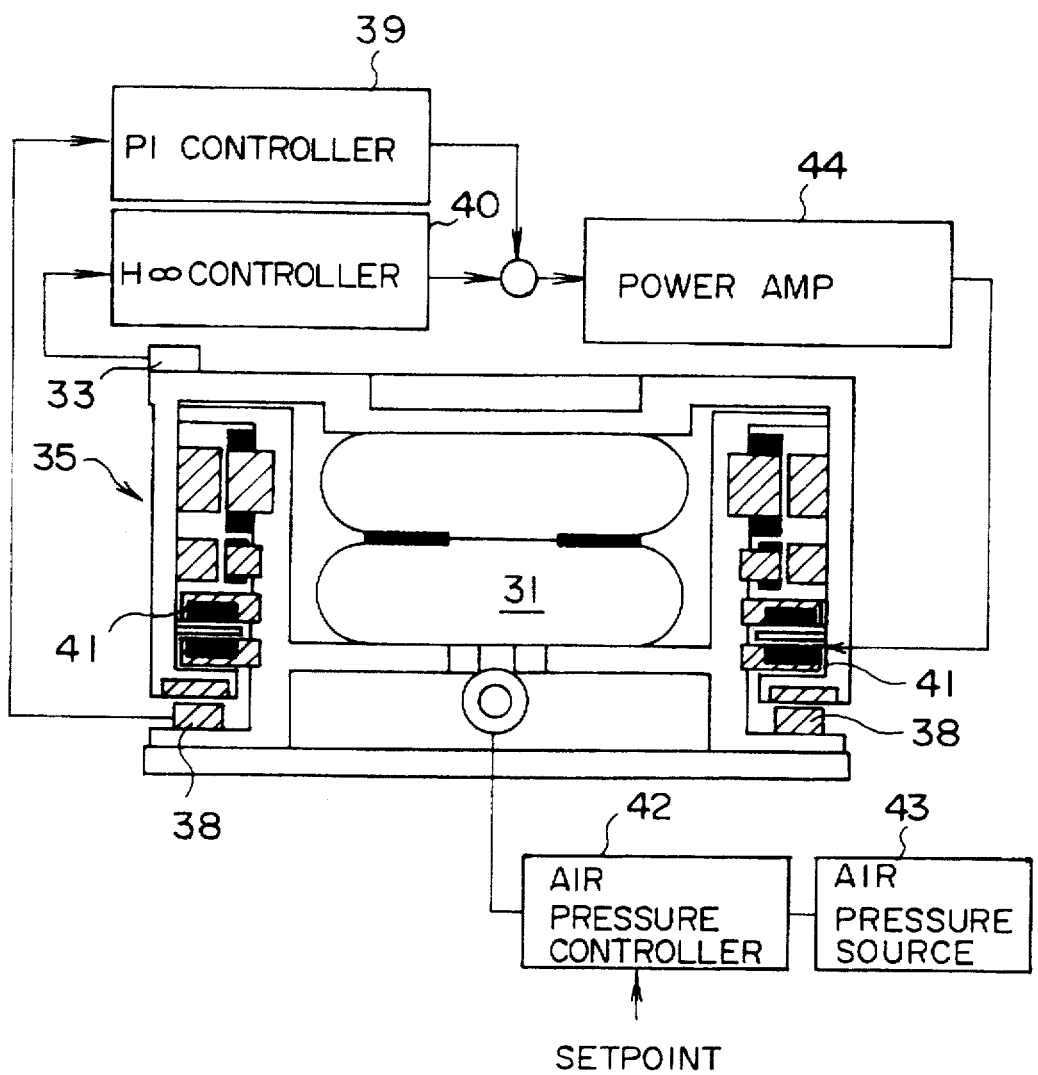
FIG. 19 is a cross-sectional view, partly in block form, of a control system of the magnetically levitated vibration damping apparatus shown in FIGS. 17 and 18.

FIG. 19 illustrates a control system of the magnetically levitated vibration damping apparatus shown in FIGS. 17 and 18. As shown in FIG. 19, signals from the displacement sensors 38 are supplied to a PI controller 39 which controls the table 30 to be positioned. Signals from the acceleration sensors 33 are supplied to an H∞ controller 40 which eliminates vibrations applied to the table 30. Control signals from the PI controller 39 and the H∞ controller 40 are supplied through a power amplifier 44 to electromagnets 41 of the electromagnetic actuators 35. The control system shown in FIG. 19 thus effects a combination of H∞ control and PI control, so that positioning stability control is added to the H∞ control. Therefore, the magnetically levitated vibration damping apparatus shown in FIGS. 17 and 18 is capable of sufficiently attenuating vertical vibrations applied to the table 30 while stably positioning the table 30. The air spring 31 are supplied with an air pressure which is delivered from an air pressure source 43 and controlled by an air pressure controller 42 based on a setpoint.

According to the second embodiment, since most of the weight of the table 30 and the high-precision system supported on the table 30 is borne by the air springs 31, the capacity of the electromagnetic actuators 35 may be reduced to ⅒ or less, for example. The table 30 can be positioned highly accurately and quickly to a precision of several μm because it is under PI control.

Figure 20:
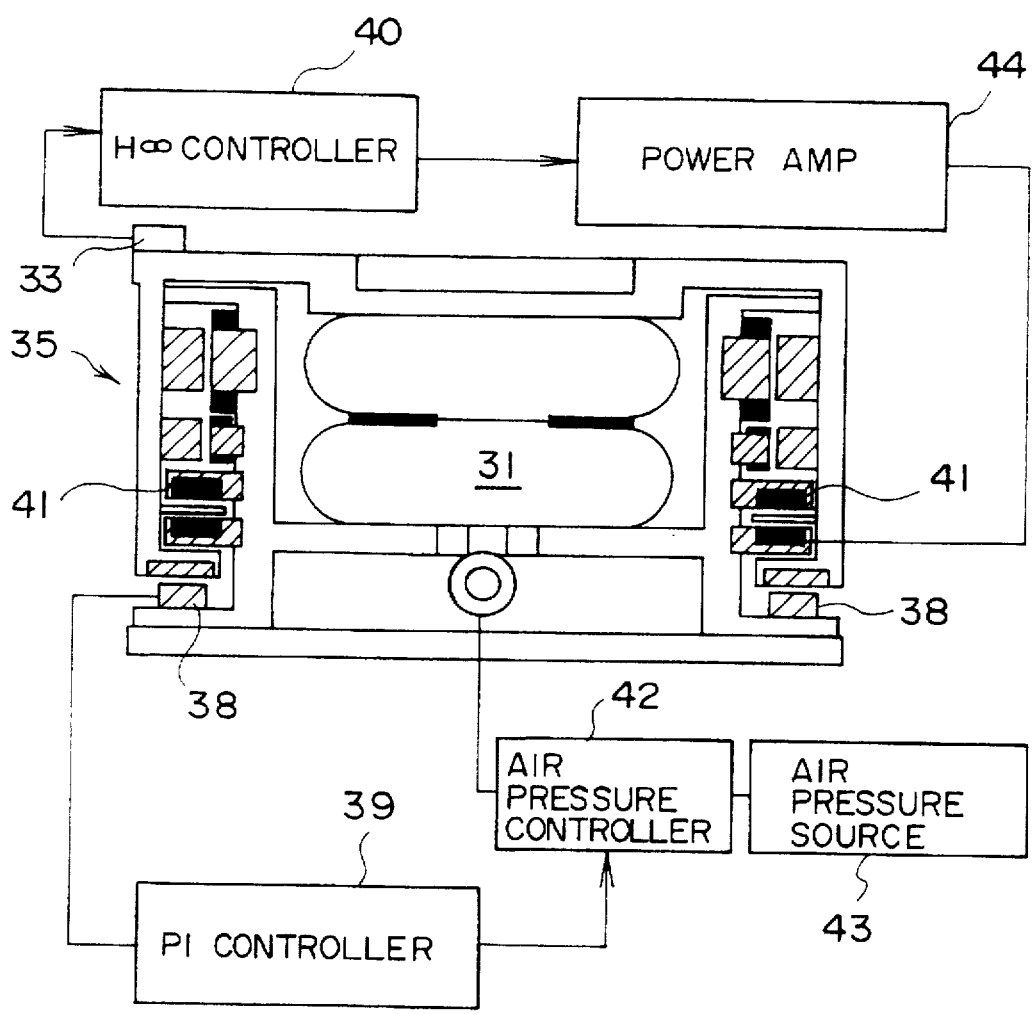
FIG. 20 is a front elevational view of a control system of a magnetically levitated vibration damping apparatus according to a third embodiment of the present invention.

FIG. 20 shows a control system of a magnetically levitated vibration damping apparatus according to a third embodiment of the present invention. The control system shown in FIG. 20 is similar to the control system shown in FIG. 19 except that signals from the displacement sensors 38 are supplied to the PI controller 39 which outputs control signals to the air pressure controller 42 to control the air pressure supplied to the air springs 31, and signals from the acceleration sensors 33 are supplied to the H∞ controller 40 which outputs control signals through the power amplifier 44 to the electromagnetic actuators 41 for thereby eliminating vibrations applied to the table 30. The control system shown in FIG. 20 also effects a combination of H∞ control and PI control, so that positioning stability control effected by the air springs 31 is added to the H∞ control. Therefore, the magnetically levitated vibration damping apparatus shown in FIG. 20 is also capable of sufficiently attenuating vertical vibrations applied to the table 30 while stably positioning the table 30.

With the control system shown in FIG. 20, since the table 30 is positioned only by the air springs 31, the capacity of the electromagnetic actuators 35 is further reduced. However, inasmuch as the positioning of the table 30 is carried out by the pressure regulation of the air springs 31, the accuracy and response with which to position the table 30 is poorer than when the table 30 is positioned by the electromagnetic actuators 35.

Although certain preferred embodiments of the present invention have been shown and described in detail, it should be understood that various changes and modifications may be made therein without departing from the scope of the appended claims.

What is claimed is:

1. A control system for a magnetically levitated vibration damping apparatus having a table which supports a system to be isolated from a floor, said table being levitated by magnetic attractive forces of at least one electromagnetic actuator, and said control system controls a current supplied to said at least one electromagnetic actuator, comprising:

a first control rule which controls a gap between said table and said at least one electromagnetic actuator based on signals from a displacement sensor, said first control rule being a PI control rule; and a second control rule which controls vibrations of said table based on signals from an acceleration sensor, said second control rule being an H∞ control rule including stability control of a levitation of said table.

2. A control system according to claim 1, wherein said acceleration sensor is mounted on said table for detecting absolute acceleration of said table.

3. A control system according to claim 1, wherein said displacement sensor is mounted on said floor for detecting relative displacement between said floor and said table.

4. A control system according to claim 1, wherein said table is levitated out of contact from said floor.

5. A magnetically levitated damping apparatus, comprising:

a table which supports a system to be isolated from a floor;

at least one electromagnetic actuator which levitates said table by magnetive attractive forces;

an acceleration sensor;

a displacement sensor;

a control system which controls a current supplied to said at least one electromagnetic actuator, wherein said control system comprises a first control rule which controls a gap between said table and said at least one electromagnetic actuator based on signals from said displacement sensor, said first control rule being a PI control rule; and a second control rule which controls vibrations of said table based on signals from said acceleration sensor, said second control rule being an H∞ control rule including stability control of a levitation of said table.

6. An apparatus according to claim 5, wherein said acceleration sensor is mounted on said table for detecting absolute acceleration of said table.

7. An apparatus according to claim 5, wherein said displacement sensor is mounted on said floor for detecting relative displacement between said floor and said table.

8. An apparatus according to claim 5, wherein said table is levitated out of contact from said floor.

9. A method for isolating a system from vibrations of a floor, comprising the steps of:

levitating a table which supports said system from said floor with at least one electromagnetic actuator; and controlling a current supplied to said at least one electromagnetic actuator based on a first control rule and a second control rule, wherein said first control rule controls a gap between said table and said at least one electromagnetic actuator based on signals from a displacement sensor, said first control rule being a PI control rule; and wherein said second control rule controls vibrations of said table based on signals from an acceleration sensor, said second control rule being an H∞ control rule including stability control of a levitation of said table.

10. A method according to claims 9, wherein said step of controlling includes said acceleration sensor mounted on said table for detecting absolute acceleration of said table.

11. A method according to claim 9, wherein said step of controlling includes said displacement sensor mounted on said floor for detecting relative displacement between said floor and said table.

12. A method according to claim 9, wherein said step of levitating levitates said table out of contact from said floor.

13. A magnetically levitating damping device for isolating a system from vibrations of a floor, comprising:

means for levitating a table which supports said system from said floor with at least one electromagnetic actuator; and means for controlling a current supplied to said at least one electromagnetic actuator based on a first control rule and a second control rule, wherein said first control rule controls a gap between said table and said at least one electromagnetic actuator based on signals from a displacement sensor, said first control rule being a PI control rule; and wherein said second control rule controls vibrations of said table based on signals from an acceleration sensor, said second control rule being an H∞ control rule including stability control of a levitation of said table.

14. A device according to claim 13, wherein said means for controlling includes said acceleration sensor mounted on said table for detecting absolute acceleration of said table.

15. A device according to claim 13, wherein said means for controlling includes said displacement sensor mounted on said floor for detecting relative displacement between said floor and said table.

16. A device according to claim 13, wherein said means for levitating levitates said table out of contact from said floor.

* * * * *